Figure 1:
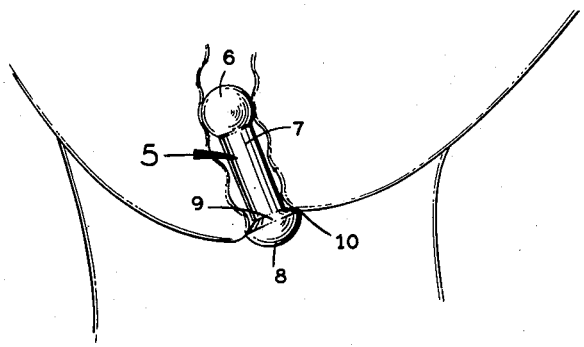

March 31, 1964     M. G. GORDON     3,126,887
SUPPOSITORY
Filed Sept. 4, 1962

INVENTOR.
MELVIN G. GORDON
BY
ATTORNEY 3,126,887
SUPPOSITORY
Melvin G. Gordon, 1072 NE. 179th Terrace,
North Miami Beach, Fla.
Filed Sept. 4, 1962, Ser. No. 221,211
1 Claim. (Cl. 128—271)

This invention relates to suppositories of the type that is adapted to be inserted into the anal canal of a person for the treatment of hemorrhoids and other disturbances of the lower terminal portion of the anal canal.

It is an object of the invention to provide a suppository for manual insertion into the anal canal having a bulbous head portion, a stem and a tail portion with the head portion adapted to engage the crypts of Morgagni to prevent disgorgement, and the tail or base of the suppository being held at the anal opening to prevent propulsion upwardly.

The invention further contemplates a molded suppository having the above indicated characteristics and with the suppository being formed of any desirable dissolvable composition, such as cocoa butter or a combination of cocoa butter and possibly wax and with the composition forming a vehicle for the medicament that is equally distributed throughout the vehicle, permitting the suppository to dissolve slowly or within a predetermined time interval for the prolonged application of the medicament to treat the anal canal from the point of entry at the anal verge and along the interior walls of the anal canal and that, when fully dissolved, will leave no insoluble residue in the anal canal.

Novel features of construction and operation of the device will be more clearly apparent during the course of the following description, reference being had to the accompanying drawings wherein has been illustrated preferred forms of the device and wherein like characters of reference are employed to denote like parts throughout the several figures.

Figure 2:
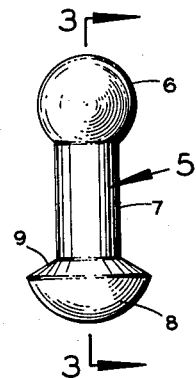
Figure 3:
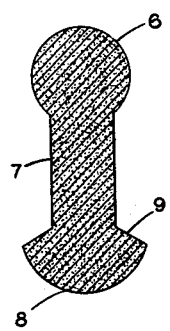
Figure 4:
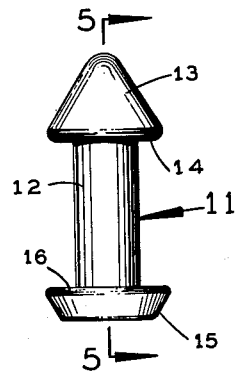
Figure 5:
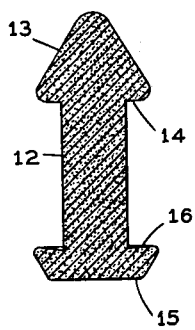

In the drawings:

FIGURE 1 is a side elevation of a suppository constructed in accordance with the invention and shown in use, FIGURE 2 is an enlarged side elevation of the suppository, FIGURE 3 is a vertical section taken substantially on line 3—3 of FIGURE 2, FIGURE 4 is a side elevation of a slightly modified form of suppository, and FIGURE 5 is a vertical section taken substantially on line 5—5 of FIGURE 4.

Referring specifically to the drawings and particularly to FIGURES 1–3, the suppository has been illustrated as a whole by the numeral 5. The suppository comprises a molded body of meltable or dissolvable material, such as a cocoa butter base and includes a bulbous head portion 6, a cylindrical stem 7 and a semi-cylindrical tail portion 8, communicating with the stem by a beveled shoulder 9. As shown in FIGURE 3, it has been shown, that the suppository 5 has been molded from the dissolvable material and with the medicaments being dispersed throughout the molded body and so that the medicaments will continuously function to relieve any disturbances in the anal canal throughout its life.

In the use of this form of the invention, as illustrated in FIGURE 1, the suppository 5 is inserted through the anal opening 10 to the point where the bevel portion of the tail 8 will engage the sphincter muscle in which position, the head 6 will engage at approximately the crypts of Morgagni. The head 6 maintains the suppository against disgorgement downwardly, while the tail 8 is held at the anal opening and will prevent propulsion upwardly due to the action of the sphincter muscles. The suppository is thus positively held in the area of the hemorrhoids or other infection, permitting the gradual dissolving of the suppository and the application of the medicament to the walls of the anal canal and to the area of the sphincter muscle. The tissues of the anal canal would receive constant topical application of the remedial drug agent along with the irritated tissues of the anal openings and upwardly at the crypts of Morgagni, where suppository medication is rarely received. The dissolving of the suppository by body heat provides a relatively slow dissolving of the suppository, permitting a gradual and constant application of the drug agent to substantially the entire area of the anal canal and the area of the sphincter muscle.

In the form of the invention illustrated in FIGURES 4 and 5, the structure is basically the same, showing a suppository 11, having a cylindrical intermediate stem portion 12, a tapered head portion 13, shouldered at 14 and a tail portion 15 that is flared outwardly to provide a flange 16. This suppository is also molded of dissolvable material, such as a cocoa butter base and of course constitutes a vehicle for the particular medication, similar to the first form of the invention. This form of suppository is inserted into the anal canal to the upper end of the crypts of Morgagni, with the flange 16 abutting the anal verge. In all other respects, this modified form functions substantially identical to that previous described.

It will be apparent from the foregoing that a very desirable form of suppository has been provided for the constant treatment of an infected anal canal, will be held against disgorgement downwardly and also being held against propulsion upwardly due to the action of the muscles of the sphincter and the muscles of the anal canal. The device is intended to be dissolved slowly, leaving no insoluble residue within the anal canal and assures a constant application of the medication necessary in the treatment of diseases of the anal canal and the anal verge. The device is simple in construction and is cheap to manufacture.

It is to be understood that the invention is not limited to the precise construction shown, but that changes are contemplated as readily fall within the spirit of the invention as shall be determined by the scope of the subjoined claim.

Having described my invention what I claim as new and desire to secure by Letters Patent is:

A suppository for fitment into the anal canal and whereby to apply a medicament to the walls of the canal during a predetermined time interval, the suppository comprising a molded body portion formed entirely of a material that will slowly dissolve by body temperature, the entire body portion of the suppository constituting a vehicle for a medication for the treatment of hemorrhoids or other disturbances of the anal canal, the body portion embodying an enlarged head portion, a stem portion and an enlarged tail portion, the stem portion being of constant diameter throughout its length and of less diameter than the diameter of the head and tail portions, and with the head and tail portions being of substantially the same diameter, the suppository being of such length as to position the head portion in the upper crypts of Morgagni in the canal to prevent disgorgement of the suppository while the tail portion contacts the outer surface of the anal opening of the human body to prevent upward propulsion of the suppository, the medication being evenly dispersed throughout the entire length, width and depth of the substance of the suppository, the increased diameter of the head portion with respect to the diameter of the stem portion insuring retention of the inserted end of the suppository within the crypts of the Morgagni to prevent disgorgement of the suppository from the anus and the diameter of the tail portion being of such increased diameter with respect to the diameter of the stem portion as to insure melting of the stem portion in advance of the enlarged tail portion without a quick upward insertion of the suppository in the anal canal.

References Cited in the file of this patent

UNITED STATES PATENTS

| | | |
|---|---|---|
| 1,762,858 | Freedman | June 10, 1930 |
| 1,915,176 | Yamaguchi | June 20, 1933 |

FOREIGN PATENTS

| | | |
|---|---|---|
| 908,087 | France | Mar. 29, 1946 |